(12) United States Patent
Knapp

(10) Patent No.: US 6,736,380 B2
(45) Date of Patent: May 18, 2004

(54) ADJUSTABLE-LENGTH GAS SPRING

(75) Inventor: Rainer Knapp, Deining (DE)

(73) Assignee: SUSPA Holding GmbH, Altdorf (DE)

( * ) Notice: Subject to any disclaimer, the term of this patent is extended or adjusted under 35 U.S.C. 154(b) by 0 days.

(21) Appl. No.: 10/327,119

(22) Filed: Dec. 24, 2002

(65) Prior Publication Data

US 2003/0116897 A1 Jun. 26, 2003

(30) Foreign Application Priority Data

Dec. 24, 2001 (DE) .......................................... 101 63 996

(51) Int. Cl.$^7$ .................................................. F16F 9/44
(52) U.S. Cl. .................................... 267/64.12; 267/131
(58) Field of Search ............................. 267/131, 64.12, 267/64.11, 124, 129, 120, 64.15, 64.18, 64.22; 188/300, 269, 322.22, 322.15, 282.5; 16/66, 84; 297/344.19, 344.1, 344.12, 91/422, 222, 428; 248/162.1, 157, 161, 631, 188.2

(56) References Cited

U.S. PATENT DOCUMENTS

| 3,656,593 A | | 4/1972 | Bauer |
| 4,949,941 A | | 8/1990 | Bauer et al. |
| 5,116,028 A | * | 5/1992 | Mintgen et al. ......... 267/64.12 |

FOREIGN PATENT DOCUMENTS

| DE | 18 12 282 | | 7/1981 | |
| DE | 3522722 | | 1/1987 | |
| DE | 3712819 | | 11/1988 | |
| DE | 39 24309 | | 12/1990 | |
| DE | 3931448 | | 4/1991 | |
| DE | 3933360 | | 4/1991 | |
| DE | 199 49 758 | | 5/2001 | |
| DE | 010163996 A1 | * | 12/2001 | ............. F16F/9/02 |
| EP | 0 353 550 | | 7/1989 | |
| EP | 1 101 972 | | 7/1989 | |

OTHER PUBLICATIONS translations of submitted DE3924309 and DE19949758.*

* cited by examiner

Primary Examiner—Douglas C. Butler
(74) Attorney, Agent, or Firm—Browdy and Neimark, P.L.L.C.

(57) ABSTRACT

A gas spring comprises a housing, in which a piston that is mounted on a piston rod is disposed for displacement, dividing the interior of the housing into two partial volumes filled with fluid. A valve is provided, by means of which to interconnect the partial volumes. The valve is designed such that, when a force that acts in the piston-rod push-in direction exceeds a given threshold, a valve pin, which serves to open and close the valve, is displaceable from a closing position against a spring unit into a position of opening by overload.

2 Claims, 4 Drawing Sheets

ADJUSTABLE-LENGTH GAS SPRING

BACKGROUND OF THE INVENTION

1. Field of the Invention

The invention relates to an adjustable-length gas spring comprising a housing, which has a central longitudinal axis and is filled with a free-flowing fluid; a guide and seal unit, which closes a first end of the housing; a piston rod, which has an outer end and is extended from, and sealed towards, the first end of the housing by the guide and seal unit; a piston, which is connected with the piston rod and sealingly guided in the housing; a first partial volume, which is formed between the piston and the guide and seal unit; a second partial volume, which is defined by the piston and turned away from the first partial volume; and a valve for interconnection of the partial volumes, which has a valve pin which can be actuated from outside the housing and which, when pushed in a valve opening direction in the sense of the central longitudinal axis, is moved into an opening position of the valve and into a closing position by pressure of the fluid counter to the valve opening direction.

2. Background Art

Great numbers of gas springs of the generic type have been described. For instance, so-called double-tube gas springs are known, in which two tubes are arranged concentrically one within the other, defining an annular channel between them. Partial volumes are formed on both sides of the piston, which are interconnected by way of the annular channel and the valve that is disposed on one end of the housing. Adjustable-length gas spring of this type have been known for example from U.S. Pat. No. 3,656,593.

Furthermore, adjustable-length gas springs have been described, in which the valve is disposed in the piston and which are operated by a valve-actuating rod that is disposed inside the hollow piston rod. Gas springs of this type are known for instance from U.S. Pat. No. 4,949,941. In gas springs of that type, hydraulic fluid may fill the partial volumes of the housing; the pressure gas filling is then only located in a pressure gas chamber which is allocated to the closed end of the housing and which is divided from the neighboring partial volume by a slide piston which is guided on, and sealed towards, the inside wall of the housing.

All these familiar gas springs have in common that damages to, or destruction of, the gas spring may occur in the case of excess pressure between the housing and the piston rod i.e., when a force that exceeds given reasonable dimensions tends to pushing the piston rod into the housing. This problem is rather pronounced in the above-mentioned hydraulically lockable single-tube gas springs, for example when used in hospital beds.

EP 1 101 972 A2 teaches an extension gas spring which has a housing with a piston rod concentrically guided therein. Arranged on the piston rod is a piston which is sealingly guided in the housing, dividing an oil chamber into two partial volumes. A valve is available, interconnecting the two partial volumes and having a valve pin, which is actuated from outside the housing and which, when pushed in a valve opening direction in the sense of a central longitudinal axis, is moved into a position in which the valve opens and, by the action of a restoring spring counter to the valve opening direction, into a position in which the valve closes. Integrated into the housing subsequently to the oil chamber is an extension gas spring which the piston rod is led into.

Inside the piston that divides the oil chamber into partial volumes, provision is additionally made for a pressure relief valve of the type of a check valve which includes a channel that passes through the piston and interconnects the partial volumes and that is closed on one side by a spring-loaded packing disk. This pressure relief valve opens when a force that exceeds an admissible force acts between the piston rod and the housing.

SUMMARY OF THE INVENTION

It is an object of the invention, to embody a gas spring of the generic type such that damages to, or destruction of, the gas spring are avoided even in the case of high forces of pressure that exceed given admissible thresholds.

According to the invention, this object is attained in a gas spring of the generic type by the features which consist in that, when a force that acts between the piston rod and the housing in a push-in direction of the piston rod exceeds a given threshold, the valve pin is displaceable from the closing position counter to the valve opening direction and against a spring unit into a position of opening by overload. The gist of the invention resides in that the valve pin, upon excess pressure, may deviate counter to the direction of opening, releasing a junction between the partial volumes for pressure balance to take place within the gas spring.

Further features, advantages and details of the invention will become apparent from the ensuing description of an exemplary embodiment, taken in conjunction with the drawing.

DESCRIPTION OF THE PREFERRED EMBODIMENT

Figure 1:
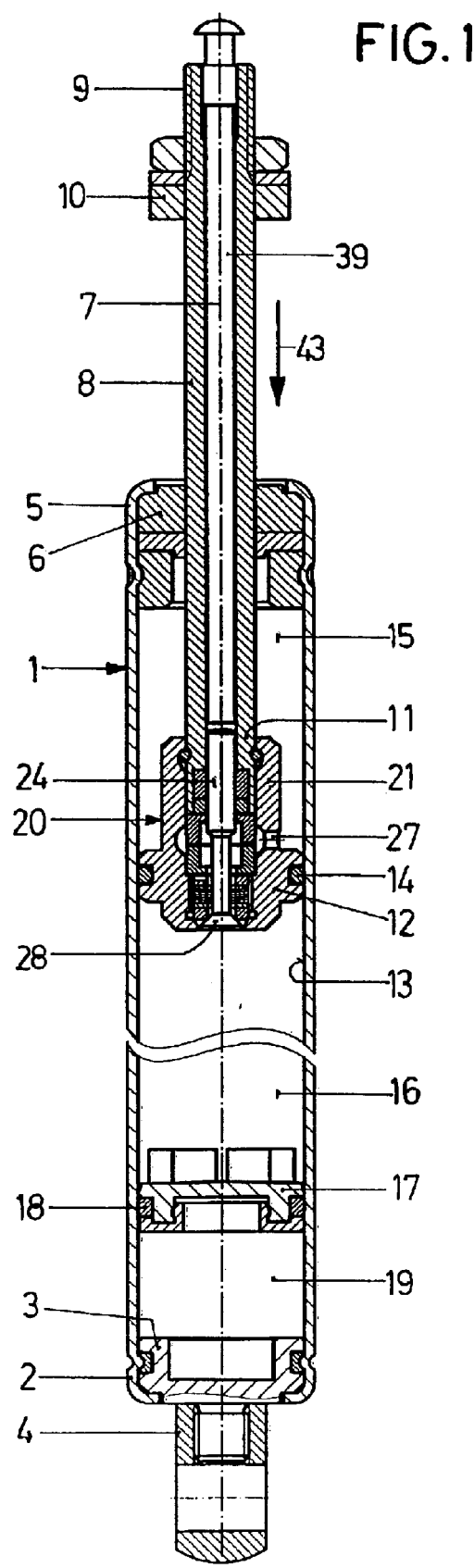
FIG. 1 is a longitudinal sectional view of a gas spring according to the invention.
Figure 2:
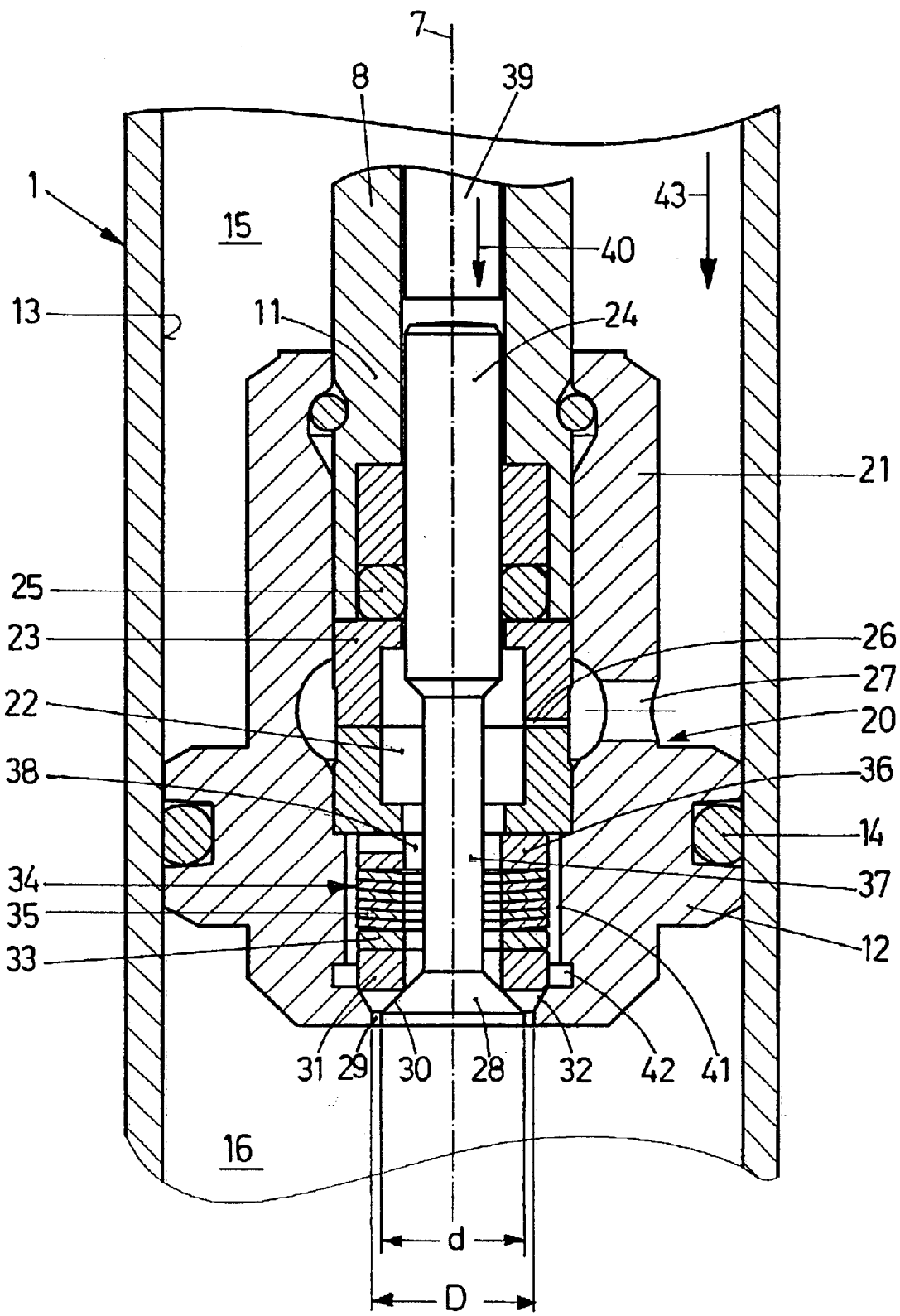
FIG. 2 is a longitudinal sectional view, on a strongly enlarged scale as compared to FIG. 1, of the valve of the gas spring in a closed state.

The adjustable-length, rigidly lockable gas spring seen in the drawing includes a substantially cylindrical housing 1 made of a single tube, an end 2 of which is closed gas-tightly by means of a bottom 3; a fastening member 4 is fixed to the bottom 3. The other end 5 of the housing 1 is equipped with an annular guide and seal unit 6 as a fluid seal, serving to guide and seal a piston rod 8 that is displaceably arranged in the housing 1 concentrically of the central longitudinal axis 7 thereof. The free end 9, outside the housing 1, of the piston rod 8 is likewise provided with a fastening member 10.

A piston 12 is mounted on the end 11, inside the housing 1, of the piston rod 8; it is guided on the housing 1 inside wall 13 and fluid-sealed towards it by means of a seal 14. The piston 12 divides the interior of the housing into a partial volume 15, which is located between the piston 12 and the guide and seal unit 6, and a partial volume 16, which is turned away therefrom. The partial volume 16 is defined by a slide piston 17, which is guided for displacement on the inside wall 13 of the housing 1 and sealed by a seal 18 for gas and fluid tightness towards the inside wall 13. A pressure-gas chamber 19 is disposed between the slide piston 17 and the bottom 3, holding pressurized gas. The partial volumes 15, 16 are filled with a fluid, for instance hydraulic fluid.

A valve 20 is formed in the piston 12, by means of which to connected to, or separate from, each other the partial volumes 15, 16. It comprises a valve assembly 21 on the side of the piston 12 that is turned towards the guide and seal unit 6. Disposed in the hollow valve assembly 21 is a two-piece bush 23 which defines an overflow space 22 and through which passes a displaceable valve pin 24 that is coaxial with the axis 7. Between the bush 23 and the hollow piston rod 8, the valve pin 24 is sealed externally by a seal 25. By means of a throttling orifice 26, which is formed in the bush 23, the overflow space 22 is permanently connected to the partial volume 15 via an overflow channel 27 that is formed in the valve assembly 21.

On its end turned towards the partial volume 16, the valve pin 24 has a valve disk 28, which is disposed in the junction 29 of the valve 20 towards the partial volume 16. By its sealing surface 30 that is turned towards the bush 23, the valve disk 28 bears against the seal 31. This seal 31 bears against a bearing surface 32 of the valve assembly 21; the bearing surface 32 tapers towards the junction 29. The seal 31 bears by an intermediate ring 33 against a spring unit 34 which consists for example of several disk springs 35. This spring unit 34 bears against the bush 23 by a substantially annular spacer 36. The diameter d of the valve disk 28 is smaller then the diameter D of the junction 29.

In the area between the overflow space 22 and the valve disk 28, the valve pin 24 has a tapered section 37, between which and the neighboring parts, namely the bush 23, the spacer 36, the spring unit 34, the intermediate ring 33 and the seal 31, is formed an annular channel 38 which leads as far as to valve disk 28. Disposed in the hollow piston rod 8 is a valve actuating rod 39, which is movable in the direction of the axis 7 and actuated by displacement from the end 11 and which bears against the valve pin 24.

Figure 3:
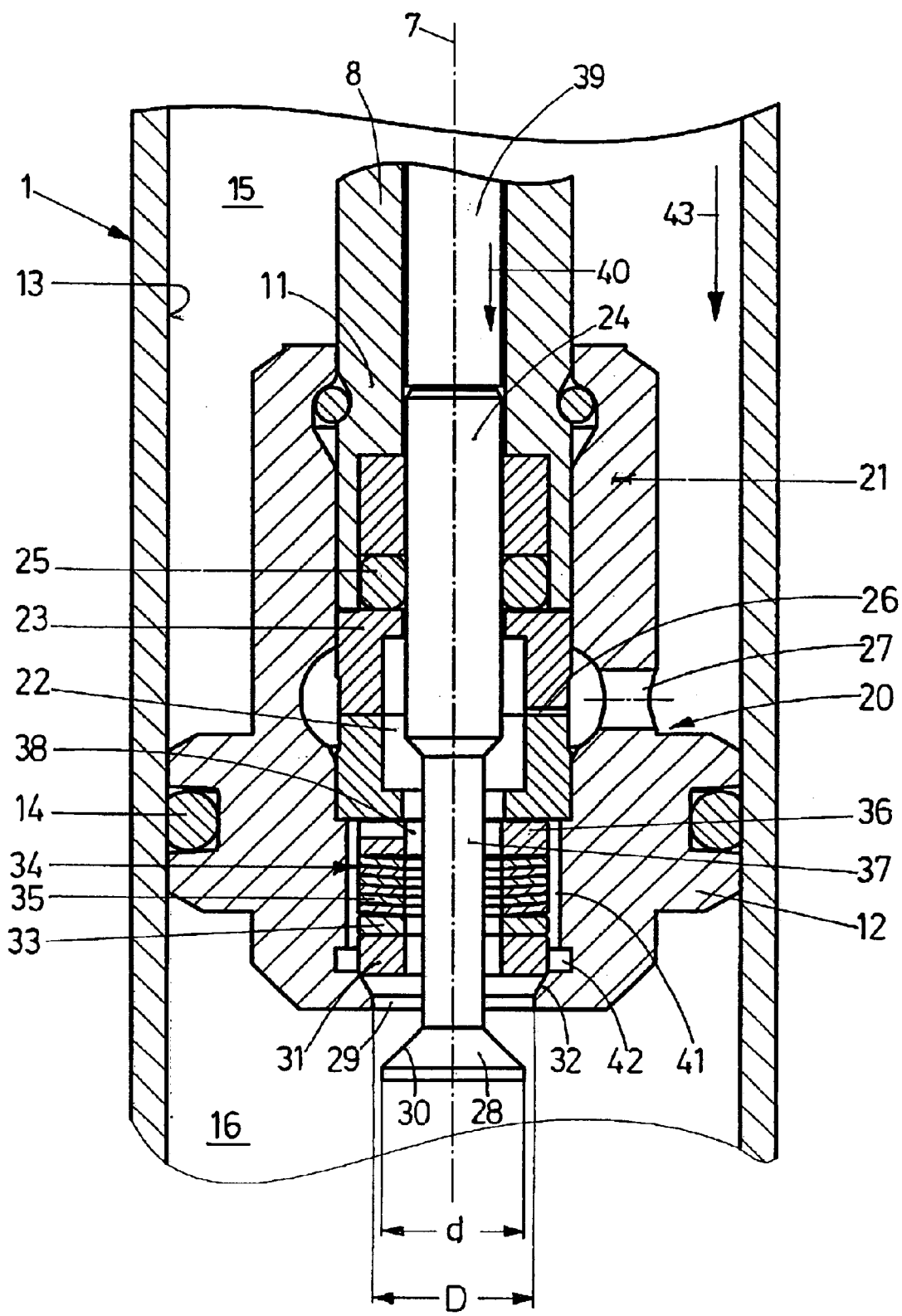
FIG. 3 is an illustration, according to FIG. 2, of the valve of the gas spring in a state opened by actuation.

If this rod 39 is pushed into the piston rod 8 in the valve opening direction 40, as seen in FIG. 3, then the valve pin 24 is shifted from the closing position in the direction towards the partial volume 16 into a valve opening position, whereby the sealing surface of the valve disk 28 lifts off the seal 31 so that the partial volume 15 is connected to the partial volume 16 via the overflow channel 27, the throttling orifice 26, the overflow space 22, the channel 38 and the junction 29 so that, when the piston rod 8 is pushed into the housing 1, hydraulic fluid can flow from the partial volume 16 into the partial volume 15. This push-in operation takes place against the opposed force produced by the pressure gas in the pressure gas chamber 19, with the slide piston 17, during this motion, being displaced towards the bottom 3 while further compressing the pressure gas. If however the piston rod 8 is relieved when the valve is open, then it is pushed out of the housing 1 by the force exercised by the pressure gas; the slide piston 17 is moved away from the bottom 3. Consequently, the gas spring is a pressure gas spring. When the actuating rod 39 is released, then the valve pin 24 is again forced into its closing position by the pressure acting in the partial volume 16. The piston 12, together with the piston rod 8, is then hydraulically rigidly locked in relation to the housing 1.

Figure 4:
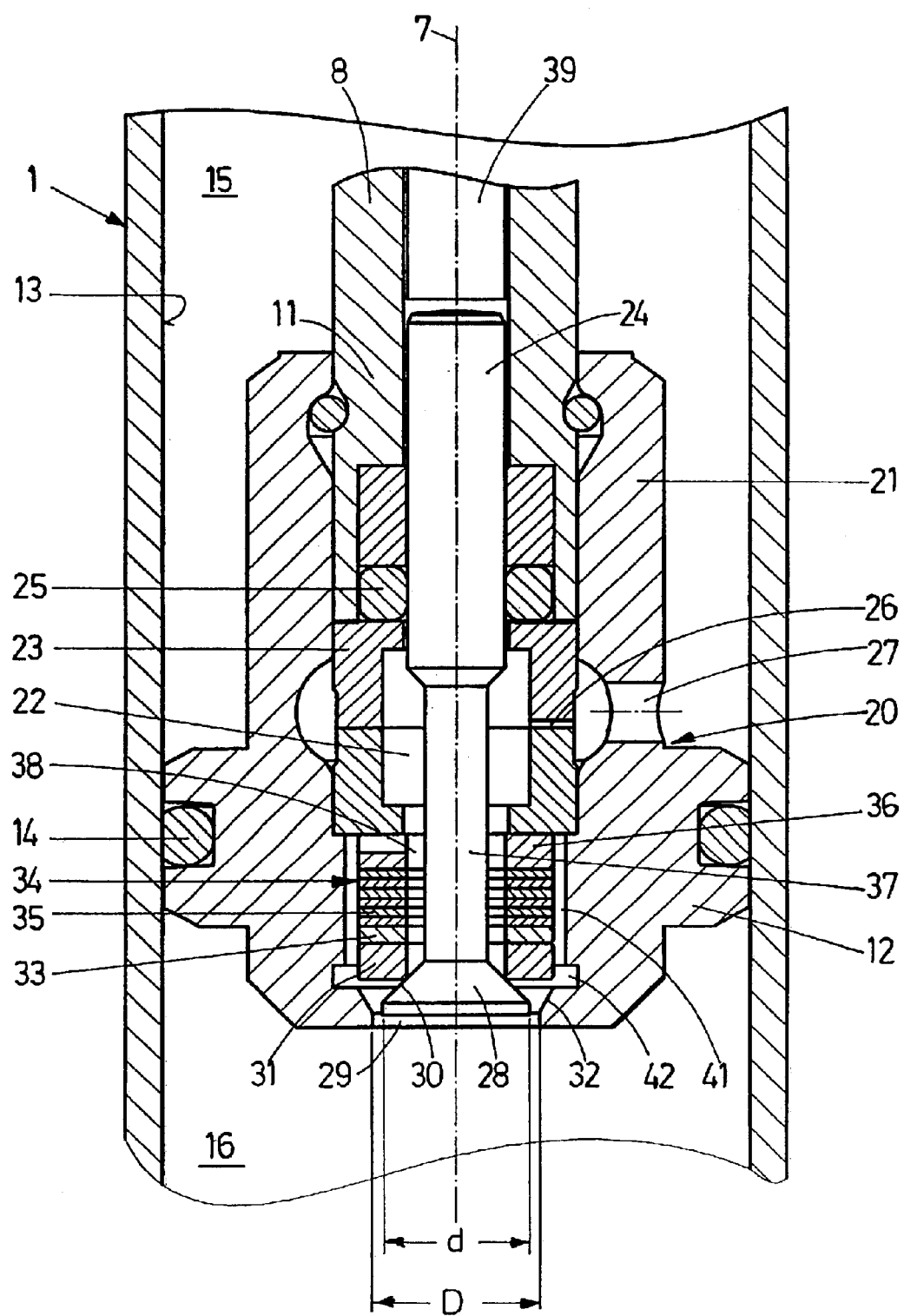
FIG. 4 is a longitudinal sectional view, according to FIG. 1, of the valve of the gas spring when opened upon overstressing.

Overload channels 41 are formed in the valve body 21 externally around the seal 31, the intermediate ring 33, the spring unit 34 and the spacer 36; they are parallel to the axis 7 and connected to the overflow space 22 via the spacer 36. They adjoin an annular channel 42 which is formed in the valve assembly 21 adjacent the bearing surface 32 and encircles the seal 31. If the piston rod 8 is loaded by a force that exceeds a given threshold i.e., if it is pushed into the housing 1 in a piston-rod push-in direction 43, then the force that is directed from the partial volume 16 on to the valve disk 28 exceeds a threshold given by the dimensioning of the spring unit 34 i.e., the spring unit 34—in the same way as the seal 31—is compressed to such an extent that the seal 31 lifts off the bearing surface 32, whereby the partial volume 16, via the junction 29, the annular channel 42 and the overload channels 41, is connected to the overflow space 22 and thus to the partial volume 15, as seen in FIG. 4. The valve pin 24 is now in a position of opening by overload. Hydraulic fluid can flow from the partial volume 16 to the partial volume 15, although the valve 21 itself has not been opened by the actuating rod 39. Upon reduction of the overload between the piston rod 8 and the housing 1, the valve 20 closes again.

Fundamentally, it is also conceivable that the spring unit is exclusively formed by a correspondingly dimensioned seal 31. The design, according to the invention, of the valve may also be used in so-called double-tube gas springs, in which the valve is arranged on the end of the housing opposite the guide and seal unit, it being possible, via the valve and an annular space between the two tubes, to interconnect the two partial volumes 15, 16. Lots of adjustable length gas springs of this type are known and have been described for instance in U.S. Pat. No. 3,656,593.

What is claimed is:

1. An adjustable length gas spring, comprising
   a housing (1), which has a central longitudinal axis (7) and is filled with a free-flowing fluid;
   a guide and seal unit (6), which closes a first end (5) of the housing (1);
   a piston rod (8), which has an outer end (9) and is extended from, and sealed towards, the first end (5) of the housing (1) by the guide and seal unit (6);
   a piston (12), which is connected with the piston rod (8) and sealingly guided in the housing (1);
   a first partial volume (15), which is formed between the piston (12) and the guide and seal unit (6);
   a second partial volume (16), which is defined by the piston (12) and turned away from the first partial volume (15); and
   a valve (20) for interconnection of the partial volumes (15, 16), which has a valve pin (24) which is actuated from outside the housing (1) and which,
   when pushed in a valve opening direction (40) in the sense of the central longitudinal axis (7), is moved into an opening position of the valve (20) and into a closing position by pressure of the fluid counter to the valve opening direction (40);
   wherein, when a force that acts between the piston rod (8) and the housing (1) in a push-in direction (43) of the piston rod (8) exceeds a given threshold, the valve pin (24) is displaceable from the closing position counter to the valve opening direction (40) and against a spring unit (34) into a position of opening by overload;
   wherein the valve (20) comprises a valve assembly (21), in which the valve pin (24) is disposed;
   wherein the valve pin (24) comprises a valve disk (28) with a sealing surface (30) that bears against a seal (31);
   wherein the seal (31), in the closing position of the valve pin (24), bears sealingly against the valve assembly (21) and, in the position of opening by overload, releases an overload channel (41) which interconnects the partial volumes (15, 16);
   wherein the seal (31) bears against a spring unit (34); and
   wherein the spring unit (34) is formed by at least one disk spring (35).

2. A gas spring according to claim 1, wherein the sealing surface (30) of the valve disk (28), in the opening position of the valve pin (24), is lifted off the seal (31) and releases a channel (38) that interconnects the partial volumes (15, 16).

* * * * *